US012277884B1

(12) United States Patent
Zhou et al.

(10) Patent No.: US 12,277,884 B1
(45) Date of Patent: Apr. 15, 2025

(54) GATE DRIVING CIRCUIT AND DISPLAY PANEL

(71) Applicant: Shenzhen China Star Optoelectronics Semiconductor Display Technology Co., Ltd., Guangdong (CN)

(72) Inventors: Xiang Zhou, Guangdong (CN); Baixiang Han, Guangdong (CN); Guangyao Li, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/531,799

(22) Filed: Dec. 7, 2023

(30) Foreign Application Priority Data

Oct. 24, 2023 (CN) ........................ 202311387069.X

(51) Int. Cl.
*G09G 3/20* (2006.01)

(52) U.S. Cl.
CPC ....... *G09G 3/20* (2013.01); *G09G 2310/0267* (2013.01); *G09G 2310/061* (2013.01); *G09G 2310/08* (2013.01)

(58) Field of Classification Search
CPC ............. G09G 3/20; G09G 2310/0267; G09G 2310/061; G09G 2310/08; G09G 3/3677; G09G 3/3266; G09G 3/3611; G09G 3/2092; G09G 3/36; G11C 19/28; G11C 19/00; H01L 27/1255
See application file for complete search history.

(56) References Cited

U.S. PATENT DOCUMENTS

2006/0139292 A1* 6/2006 Yoon ...................... G11C 19/00 345/100
2007/0229409 A1* 10/2007 Shin ..................... G09G 3/3266 345/76
2010/0245298 A1* 9/2010 Chen .................... G09G 3/3677 345/204
2012/0081409 A1* 4/2012 Chung ................. G09G 3/3266 327/108
2014/0159997 A1* 6/2014 Chen .................... G09G 3/3611 345/87
2015/0070258 A1* 3/2015 Miyake .................. G11C 19/28 345/92
2017/0124970 A1* 5/2017 Li ........................ G09G 3/3677
2017/0162159 A1* 6/2017 Miyake .................. G11C 19/28
2017/0178558 A1* 6/2017 Zhou .................... G09G 3/2092
(Continued)

*Primary Examiner* — Richard J Hong
(74) *Attorney, Agent, or Firm* — PV IP PC; Wei Te Chung

(57) ABSTRACT

A gate driving circuit includes a gate driving unit arranged in a multi-stage cascade. The gate driving unit includes a pull-up control module, a pull-up node, a first output module, a second output module, a pull-down control module, a first pull-down module, a pull-down node, a second pull-down module, and a pull-down maintenance module. The pull-up control module is configured to pull up a potential of the pull-up node under a control of a first clock signal input at a first clock signal input terminal. The pull-down control module is configured to pull up a potential of the pull-down node under a control of the first clock signal. The first pull-down module is configured to pull the potential of the pull-down node down to a potential of the first clock signal under a control of the potential of the pull-up node.

20 Claims, 3 Drawing Sheets

(56) References Cited

U.S. PATENT DOCUMENTS

| | | | | |
|---|---|---|---|---|
| 2017/0270881 | A1* | 9/2017 | Li | G09G 3/3677 |
| 2017/0301303 | A1* | 10/2017 | Li | H01L 27/1255 |
| 2018/0136500 | A1* | 5/2018 | Li | G09G 3/36 |
| 2018/0174543 | A1* | 6/2018 | Miyake | G09G 3/3677 |
| 2019/0019460 | A1* | 1/2019 | Shi | G09G 3/3266 |
| 2019/0172408 | A1* | 6/2019 | Miyake | G11C 19/28 |
| 2021/0225314 | A1* | 7/2021 | Miyake | G09G 3/3677 |
| 2023/0252952 | A1* | 8/2023 | Miyake | G11C 19/28 345/92 |
| 2024/0169950 | A1* | 5/2024 | Jia | G09G 3/3677 |

* cited by examiner

GATE DRIVING CIRCUIT AND DISPLAY PANEL

CROSS REFERENCE TO RELATED APPLICATIONS

The present application claims priority to Chinese Patent Application No. 202311387069.X, filed on Oct. 24, 2023, and entitled "GATE DRIVING CIRCUIT AND DISPLAY PANEL". The entire disclosures of the above application are incorporated herein by reference.

TECHNICAL FIELD

The present application relates to the field of display technology, in particular to a gate driving circuit and a display panel.

BACKGROUND

Gate driving on array (GOA) technology uses a thin film transistor array process to fabricate gate driving circuits on a thin film transistor array substrate to achieve a progressive scanning driving method. The gate driving circuit includes a plurality of cascaded gate driving units.

In order to ensure the realization of basic functions of the gate driving circuit and improve stability of the gate driving circuit, existing gate driving units are generally equipped with dozens of thin film transistors. Dozens of thin film transistors are electrically connected to multiple different driving signal input terminals, making a structure of the gate driving circuit very complex.

SUMMARY

The purpose of embodiments of the present application is to provide a gate driving circuit and a display panel, the gate driving circuit and the display panel can reduce a number of driving signal input terminals that need to be connected to the gate driving unit, thereby simplifying structures of the gate driving circuit and the display panel.

On the one hand, embodiments of the present application provide a gate driving circuit comprising a gate driving unit arranged in a multi-stage cascade, wherein the gate driving unit comprises a pull-up control module, a pull-up node, a first output module, a second output module, a pull-down control module, a first pull-down module, a pull-down node, a second pull-down module, and a pull-down maintenance module; wherein the pull-up control module is electrically connected to a first clock signal input terminal and the pull-up node, and the pull-up control module is configured to pull up a potential of the pull-up node under a control of a first clock signal input at the first clock signal input terminal; wherein the first output module is electrically connected to a second clock signal input terminal, the pull-up node, and a current-stage scanning signal output terminal, the first output module is configured to output a current-stage scanning signal under a control of the potential of the pull-up node; wherein the second output module is electrically connected to a third clock signal input terminal, the pull-up node, and a current-stage transmission signal output terminal, and the second output module is configured to output a current-stage transmission signal under the control of the potential of the pull-up node; wherein the pull-down control module is electrically connected to the first clock signal input terminal and the pull-down node, and the pull-down control module is configured to pull up a potential of the pull-down node under a control of the first clock signal; wherein the first pull-down module is electrically connected to the first clock signal input terminal, the pull-up node, and the pull-down node, and the first pull-down module is configured to pull the potential of the pull-down node down to a potential of the first clock signal under the control of the potential of the pull-up node; wherein the second pull-down module is electrically connected to the current-stage scanning signal output terminal, the current-stage transmission signal output terminal, and the pull-down node, and the second pull-down module is configured to pull down a potential of the current-stage scanning signal and the potential of the current-stage transmission signal under the control of the potential of the pull-down node; wherein the pull-down maintenance module is electrically connected to the second clock signal input terminal, the pull-up node, and the pull-down node, and the pull-down maintenance module is configured to maintain the potential of the pull-up node at a low potential under a control of a second clock signal input from the second clock signal input terminal and the potential of the pull-down node.

Optionally, in some embodiments of the present application, a phase of the first clock signal is opposite to a phase of the second clock signal, and the phase of the second clock signal is the same as a phase of a third clock signal input from a third clock signal input terminal.

Optionally, in some embodiments of the present application, the pull-up control module comprises a first transistor, a gate of the first transistor is electrically connected to a first clock signal input terminal, a first electrode of the first transistor is electrically connected to a previous-stage transmission signal input terminal, and a second electrode of the first transistor is electrically connected to the pull-up node.

Optionally, in some embodiments of the present application, the first output module comprises a second transistor and a first capacitor, a gate of the second transistor is electrically connected to the pull-up node, a first electrode of the second transistor is electrically connected to the second clock signal input terminal, and a second electrode of the second transistor is electrically connected to the current-stage scanning signal output terminal; wherein a first plate of the first capacitor is electrically connected to the pull-up node, and a second plate of the first capacitor is electrically connected to the current-stage scanning signal output terminal; wherein the second output module comprises a third transistor, a gate of the third transistor is electrically connected to the pull-up node, a first electrode of the third transistor is electrically connected to the third clock signal input terminal, and a second electrode of the third transistor is electrically connected to the current-stage signal output terminal.

Optionally, in some embodiments of the present application, the pull-down control module comprises a fourth transistor, a gate of the fourth transistor is electrically connected to the first clock signal input terminal, a first electrode of the fourth transistor is electrically connected to a reference high-potential signal input terminal, and a second electrode of the fourth transistor is electrically connected to the pull-down node.

Optionally, in some embodiments of the present application, the first pull-down module comprises a fifth transistor, a gate of the fifth transistor is electrically connected to the pull-up node, a first electrode of the fifth transistor is electrically connected to the first clock signal input terminal, and a second electrode of the fifth transistor is electrically connected to the pull-down node; wherein the second pull-down module comprises a sixth transistor, a seventh transistor, and a second capacitor, a gate of the sixth transistor is electrically connected to the pull-down node, a first electrode of the sixth transistor is electrically connected to a reference low-potential signal input terminal, and a second electrode of the sixth transistor is electrically connected to the current-stage scanning signal output terminal; wherein a gate of the seventh transistor is electrically connected to the pull-down node, a first electrode of the seventh transistor is electrically connected to the reference low-potential signal input terminal, and a second electrode of the seventh transistor is electrically connected to the current-stage signal output terminal; wherein a first plate of the second capacitor is electrically connected to the pull-down node, and a second plate of the second capacitor is electrically connected to the reference low-potential signal input terminal.

Optionally, in some embodiments of the present application, the pull-down maintenance module comprises an eighth transistor and a ninth transistor, a gate of the eighth transistor is electrically connected to the pull-down node, a first electrode of the eighth transistor is electrically connected to the reference low-potential signal input terminal, and a second electrode of the eighth transistor is electrically connected to a first electrode of the ninth transistor; wherein a gate of the ninth transistor is electrically connected to a second clock signal input terminal, and a second electrode of the ninth transistor is electrically connected to the pull-up node.

Optionally, in some embodiments of the present application, the gate driving unit further comprises a detection module, the detection module is electrically connected to the pull-up node, and the detection module is configured to raise the potential of the pull-up node in at least one stage of the gate driving unit after all the gate driving units in the multi-stage cascade output the current-stage scanning signal; wherein the current-stage scanning signal output terminal outputs a current-stage scanning compensation signal under the control of the potential of the pull-up node.

Optionally, in some embodiments of the present application, the detection module comprises a tenth transistor, an eleventh transistor, a twelfth transistor, and a third capacitor, a gate of the tenth transistor is electrically connected to a selection signal input terminal, a first electrode of the tenth transistor is electrically connected to the previous-stage signal input terminal, and a second electrode of the tenth transistor is electrically connected to a gate of the eleventh transistor; wherein the first electrode of the eleventh transistor is electrically connected to the reference high-potential signal input terminal, and a second electrode of the eleventh transistor is electrically connected to a first electrode of the twelfth transistor; wherein a gate of the twelfth transistor is electrically connected to a reset signal input terminal, and a second electrode of the twelfth transistor is electrically connected to the pull-up node; wherein a first plate of the third capacitor is electrically connected to a gate of the eleventh transistor, and a second plate of the third capacitor is electrically connected to the first electrode of the eleventh transistor.

On the other hand, the present application provides a display panel comprising a pixel unit and a gate driving circuit, and the gate driving circuit is electrically connected to the pixel unit. The gate driving circuit comprises a gate driving unit arranged in a multi-stage cascade, wherein the gate driving unit comprises a pull-up control module, a pull-up node, a first output module, a second output module, a pull-down control module, a first pull-down module, a pull-down node, a second pull-down module, and a pull-down maintenance module; wherein the pull-up control module is electrically connected to a first clock signal input terminal and the pull-up node, and the pull-up control module is configured to pull up a potential of the pull-up node under a control of a first clock signal input at the first clock signal input terminal; wherein the first output module is electrically connected to a second clock signal input terminal, the pull-up node, and a current-stage scanning signal output terminal, the first output module is configured to output a current-stage scanning signal under a control of the potential of the pull-up node; wherein the second output module is electrically connected to a third clock signal input terminal, the pull-up node, and a current-stage transmission signal output terminal, and the second output module is configured to output a current-stage transmission signal under the control of the potential of the pull-up node; wherein the pull-down control module is electrically connected to the first clock signal input terminal and the pull-down node, and the pull-down control module is configured to pull up a potential of the pull-down node under a control of the first clock signal; wherein the first pull-down module is electrically connected to the first clock signal input terminal, the pull-up node, and the pull-down node, and the first pull-down module is configured to pull the potential of the pull-down node down to a potential of the first clock signal under the control of the potential of the pull-up node; wherein the second pull-down module is electrically connected to the current-stage scanning signal output terminal, the current-stage transmission signal output terminal, and the pull-down node, and the second pull-down module is configured to pull down a potential of the current-stage scanning signal and the potential of the current-stage transmission signal under the control of the potential of the pull-down node; wherein the pull-down maintenance module is electrically connected to the second clock signal input terminal, the pull-up node, and the pull-down node, and the pull-down maintenance module is configured to maintain the potential of the pull-up node at a low potential under a control of a second clock signal input from the second clock signal input terminal and the potential of the pull-down node.

Optionally, in some embodiments of the present application, a phase of the first clock signal is opposite to a phase of the second clock signal.

Optionally, in some embodiments of the present application, a phase of the second clock signal is the same as a phase of a third clock signal input from a third clock signal input terminal.

Optionally, in some embodiments of the present application, the pull-up control module comprises a first transistor, a gate of the first transistor is electrically connected to a first clock signal input terminal, a first electrode of the first transistor is electrically connected to a previous-stage transmission signal input terminal, and a second electrode of the first transistor is electrically connected to the pull-up node.

Optionally, in some embodiments of the present application, the first output module comprises a second transistor and a first capacitor, a gate of the second transistor is electrically connected to the pull-up node, a first electrode of the second transistor is electrically connected to the second clock signal input terminal, and a second electrode of the second transistor is electrically connected to the current-stage scanning signal output terminal; wherein a first plate of the first capacitor is electrically connected to the pull-up node, and a second plate of the first capacitor is electrically connected to the current-stage scanning signal output terminal.

Optionally, in some embodiments of the present application, the second output module comprises a third transistor, a gate of the third transistor is electrically connected to the pull-up node, a first electrode of the third transistor is electrically connected to the third clock signal input terminal, and a second electrode of the third transistor is electrically connected to the current-stage signal output terminal.

Optionally, in some embodiments of the present application, the pull-down control module comprises a fourth transistor, a gate of the fourth transistor is electrically connected to the first clock signal input terminal, a first electrode of the fourth transistor is electrically connected to a reference high-potential signal input terminal, and a second electrode of the fourth transistor is electrically connected to the pull-down node.

Optionally, in some embodiments of the present application, the first pull-down module comprises a fifth transistor, a gate of the fifth transistor is electrically connected to the pull-up node, a first electrode of the fifth transistor is electrically connected to the first clock signal input terminal, and a second electrode of the fifth transistor is electrically connected to the pull-down node; wherein the second pull-down module comprises a sixth transistor, a seventh transistor, and a second capacitor, a gate of the sixth transistor is electrically connected to the pull-down node, a first electrode of the sixth transistor is electrically connected to a reference low-potential signal input terminal, and a second electrode of the sixth transistor is electrically connected to the current-stage scanning signal output terminal; wherein a gate of the seventh transistor is electrically connected to the pull-down node, a first electrode of the seventh transistor is electrically connected to the reference low-potential signal input terminal, and a second electrode of the seventh transistor is electrically connected to the current-stage signal output terminal; wherein a first plate of the second capacitor is electrically connected to the pull-down node, and a second plate of the second capacitor is electrically connected to the reference low-potential signal input terminal.

Optionally, in some embodiments of the present application, the pull-down maintenance module comprises an eighth transistor and a ninth transistor, a gate of the eighth transistor is electrically connected to the pull-down node, a first electrode of the eighth transistor is electrically connected to the reference low-potential signal input terminal, and a second electrode of the eighth transistor is electrically connected to a first electrode of the ninth transistor; wherein a gate of the ninth transistor is electrically connected to a second clock signal input terminal, and a second electrode of the ninth transistor is electrically connected to the pull-up node.

Optionally, in some embodiments of the present application, the gate driving unit further comprises a detection module, the detection module is electrically connected to the pull-up node, and the detection module is configured to raise the potential of the pull-up node in at least one stage of the gate driving unit after all the gate driving units in the multi-stage cascade output the current-stage scanning signal; wherein the current-stage scanning signal output terminal outputs a current-stage scanning compensation signal under the control of the potential of the pull-up node.

Optionally, in some embodiments of the present application, the detection module comprises a tenth transistor, an eleventh transistor, a twelfth transistor, and a third capacitor, a gate of the tenth transistor is electrically connected to a selection signal input terminal, a first electrode of the tenth transistor is electrically connected to the previous-stage signal input terminal, and a second electrode of the tenth transistor is electrically connected to a gate of the eleventh transistor; wherein the first electrode of the eleventh transistor is electrically connected to the reference high-potential signal input terminal, and a second electrode of the eleventh transistor is electrically connected to a first electrode of the twelfth transistor; wherein a gate of the twelfth transistor is electrically connected to a reset signal input terminal, and a second electrode of the twelfth transistor is electrically connected to the pull-up node; wherein a first plate of the third capacitor is electrically connected to a gate of the eleventh transistor, and a second plate of the third capacitor is electrically connected to the first electrode of the eleventh transistor.

DETAILED DESCRIPTION OF ILLUSTRATED EMBODIMENTS

Figure 1:
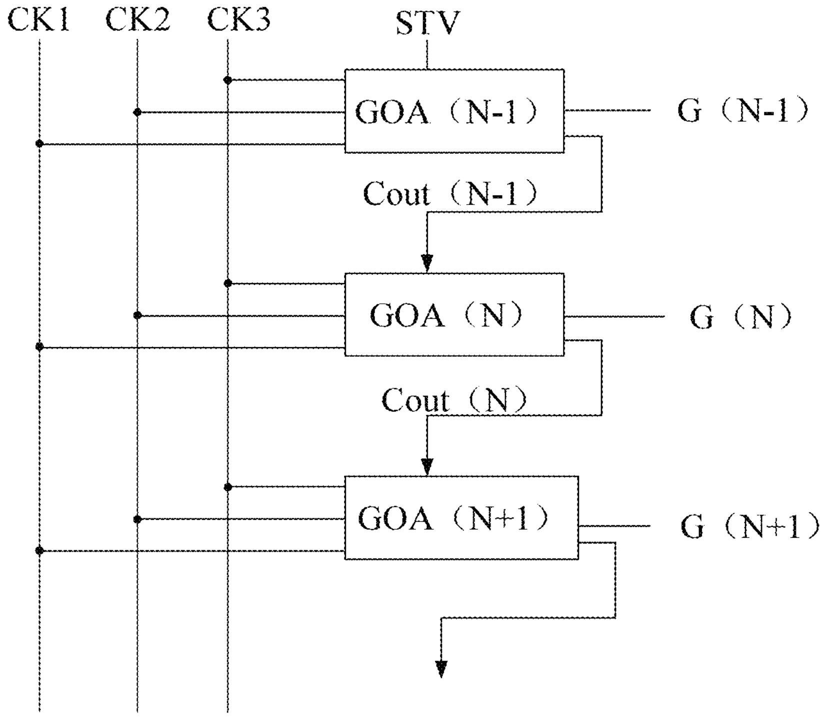
FIG. 1 is a schematic diagram of a gate driving circuit provided by an embodiment of the present application.

The technical solutions in the embodiments of the present application will be described below with reference to the drawings in the embodiments of the present application. The described technical solutions are only used to explain and illustrate the ideas of the present application and should not be regarded as limiting the protection scope of the present application.

In the present application, unless otherwise expressly stated and limited, a first feature "on" or "below" a second feature may include the first and second features directly, and it may also be included that the first and second features are not directly connected but are in contact through another feature between them. Furthermore, the first feature "on", "above", and "over" the second feature includes the first feature directly above and diagonally above the second feature, or it simply means that the first feature has a higher level than the second feature. The first feature "below", "under", and "beneath" the second feature includes the first feature being directly below and diagonally below the second feature, or it simply means that the first feature has a smaller horizontal height than the second feature. In addition, the terms "first" and "second" are used for descriptive purposes only and cannot be understood as indicating or implying relative importance or implicitly indicating the quantity of indicated technical features. Therefore, the features defined as "first" and "second" may explicitly or implicitly include one or more features.

Various embodiments provided in this application are similar, and features in different embodiments are combined with each other.

Embodiments of the present application provide a display panel including a pixel unit and a gate driving circuit. The gate driving circuit is electrically connected to the pixel unit.

Specifically, the display panel includes a plurality of pixel units arranged in an array and a plurality of scan lines. Each scan line is electrically connected to a row of pixel units. The gate driving circuit includes a plurality of gate driving units arranged in cascade. Each gate driving unit is electrically connected to one scan line. The gate driving unit is used to provide scanning signals to corresponding scan lines to control the opening of thin film transistors in pixel units of corresponding rows.

The gate driving circuit in the display panel provided by the embodiments of the present application can greatly reduce the number of driving signal input terminals that the gate driving unit needs to connect, thereby simplifying the structure of the gate driving circuit and the display panel.

The transistors used in all embodiments of this application may be thin film transistors or other devices with the same characteristics. In order to distinguish the two electrodes of the transistor except the gate electrode, one of the source and the drain is called a first electrode, and the other of the source and the drain is called a second electrode. According to the form in the drawing, an intermediate input terminal of the transistor is the gate, the signal input terminal is the first electrode, and the signal output terminal is the second electrode. In addition, the transistors used in the embodiments of the present application are P-type transistors or N-type transistors. A P-type transistor is turned on when the gate is at a low potential and is turned off when the gate is at a high potential. An N-type transistor is turned on when the gate is at a high potential and is turned off when the gate is at a low potential.

As shown in FIG. 1, the gate driving circuit provided by the embodiment of the present application includes a gate driving unit arranged in a multi-stage cascade. FIG. 1 takes the cascaded N−1th stage gate driving unit GOA(N−1), Nth stage gate driving unit GOA(N) and N+1th stage gate driving unit GOA(N+1) as example.

The N−1th stage gate driving unit GOA(N−1), the Nth stage gate driving unit GOA(N), and the N+1th stage gate driving unit GOA(N+1) are respectively connected to the scan line G(N−1), G(N), G(N+1). The Nth stage gate driving unit GOA(N) is connected to a stage transmission scanning signal Cout(N−1) output by the N−1th stage gate driving unit GOA(N−1). Correspondingly, the N+1th stage gate driving unit GOA(N+1) is connected to a stage transmission signal Cout(N) output by the Nth stage gate driving unit GOA(N), and so on. At the same time, the N−1th stage gate driving unit GOA(N−1) transmits the scanning signal to the scan line G(N−1) connected to the N−1th stage gate driving unit GOA(N−1). The Nth stage gate driving unit GOA(N) transmits the scanning signal to the scan line G(N) connected to the Nth stage gate driving unit GOA(N). The N+1th stage gate driving unit GOA(N+1) transmits the scanning signal to the scan line G(N+1) connected to the N+1th stage gate driving unit GOA(N+1), and so on.

The first stage gate driving unit GOA(1) responds to a start signal STV, and the scanning signal is transmitted to a first scan line G(1) connected to a first stage gate driving unit GOA(1) and transmitted a stage transmission signal Cout(1) to a second stage gate driving unit GOA(2). It should be noted that the Nth stage gate driving unit (N is a positive integer greater than 1) can transmit the scanning signal to the Nth scanning line G(N), and transmit the stage transmission signal Cout(N) to the N+1th stage gate driving unit GOA (N+1).

The scan driving control signal input terminal includes a first clock signal input terminal CK1, a second clock signal input terminal CK2, and a third clock signal input terminal CK3.

When the Nth stage gate driving unit operates, the scanning signal output by the Nth stage gate driving unit GOA (N) is high potential. A transistor switch that turns on each pixel in a row in the display panel and charges the pixel electrode in each pixel with a data signal. The scanning signal is used to control the operation of the N+1th stage gate driving unit. When the N+1th stage gate driving unit is working, the scanning signal output by the N+1th stage gate driving unit GOA(N+1) is high potential. At the same time, the scanning signal output by the Nth stage gate driving unit GOA(N) is low potential.

Figure 2:
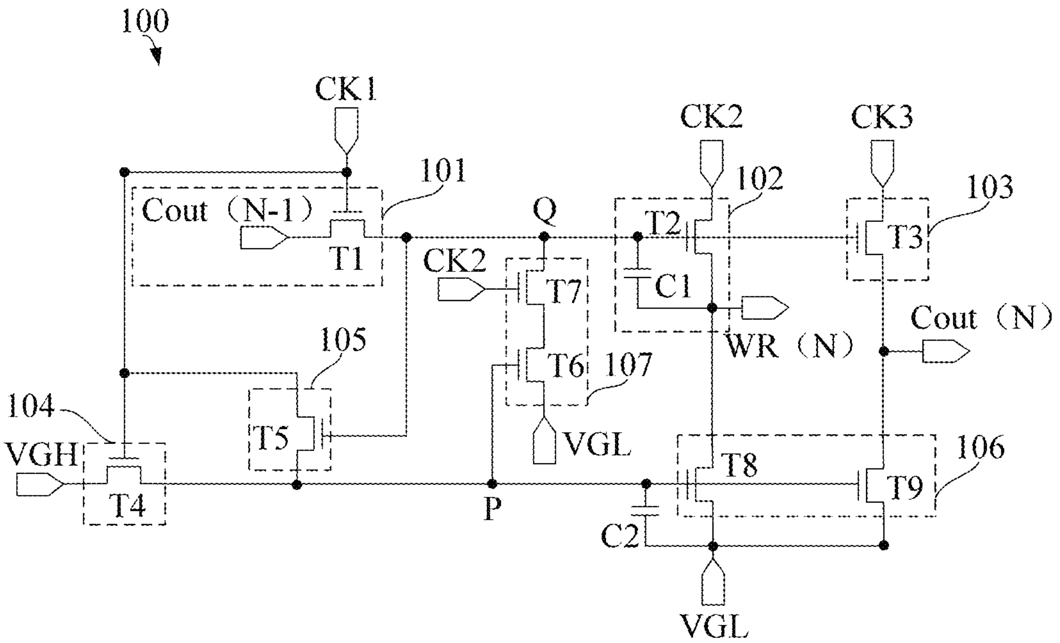
FIG. 2 is a schematic circuit diagram of a gate driving unit provided by a first embodiment of the present application.

As shown in FIG. 2, the gate driving circuit provided by the embodiment of the present application includes a gate driving unit 100 arranged in a multi-stage cascade. The gate driving unit shown in FIG. 2 is a non-initial stage gate driving unit. The gate driving unit 100 includes a pull-up control module 101, a pull-up node Q, a first output module 102, a second output module 103, a pull-down control module 104, a first pull-down module 105, a pull-down node P, a second pull-down module 106, and a pull-down maintenance module 107.

The pull-up control module 101 is electrically connected to a first clock signal input terminal CK1, a previous-stage transmission signal input terminal Cout(N−1), and the pull-up node Q. The pull-up control module 101 is configured to pull up a potential of the pull-up node Q under a control of the first clock signal input from the first clock signal input terminal CK1.

The first output module 102 is electrically connected to a second clock signal input terminal CK2, the pull-up node Q, and a current-stage scanning signal output terminal WR(N). The first output module 102 is configured to output the scanning signal of the current-stage under the control of the potential of the pull-up node Q.

The second output module 103 is electrically connected to a third clock signal input terminal CK3, the pull-up node Q, and the current-stage transmission signal output terminal Cout (N). The second output module 103 is configured to output the current-stage transmission signal under the control of the potential of the pull-up node Q.

The pull-down control module 104 is electrically connected to the first clock signal input terminal CK1 and the pull-down node P. The pull-down control module 104 is configured to pull up the potential of the pull-down node P under the control of the first clock signal.

The first pull-down module 105 is electrically connected to the first clock signal input terminal CK1, the pull-up node Q, and the pull-down node P. The first pull-down module 105 is configured to pull the potential of the pull-down node P down to the potential of the first clock signal under the control of the potential of the pull-up node Q.

The second pull-down module 106 is electrically connected to the current-stage scanning signal output terminal WR (N), the current-stage transmission signal output terminal Cout (N), and the pull-down node P. The second pull-down module 106 is configured to pull down the potential of the scanning signal of the current-stage and the potential of the current-stage transmission signal under the control of the potential of the pull-down node P.

The pull-down maintenance module 107 is electrically connected to the second clock signal input terminal CK2, the pull-up node Q, and the pull-down node P. The pull-down maintenance module 107 is configured to maintain the potential of the pull-up node Q at a low potential under the control of the second clock signal input from the second clock signal input terminal CK2 and the potential of the pull-down node P.

The gate driving circuit provided by the embodiment of the present application can control the opening and closing of the pull-up control module 101 and the pull-down control module 104 by controlling the potential of the first clock signal, thereby controlling the potential of the pull-up node Q, and the potential of the pull-down node P is controlled by the potential of the pull-up node Q. At the same time, by controlling the potential of the second clock signal and the potential of the pull-down node P, the opening and closing of the pull-down maintenance module 107 is controlled, thereby controlling the potential of the pull-up node Q. That is, by controlling the potential of the first clock signal and the potential of the second clock signal, the potential of the pull-up node Q and the potential of the pull-down node P can be controlled. This greatly reduces the number of driving signal input terminals that the gate driving unit needs to access, thereby simplifying the structure of the gate driving circuit.

As shown in FIG. 2, the pull-up control module 101 includes a first transistor T1. A gate of the first transistor T1 is electrically connected to the first clock signal input terminal CK1. A first electrode of the first transistor T1 is electrically connected to a previous-stage transmission signal input terminal Cout (N−1). A second electrode of the first transistor T1 is electrically connected to the pull-up node Q.

A first output module 102 includes a second transistor T2 and a first capacitor C1. A gate of the second transistor T2 is electrically connected to the pull-up node Q. A first electrode of the second transistor T2 is electrically connected to the second clock signal input terminal CK2. A second electrode of the second transistor T2 is electrically connected to the current-stage scanning signal output terminal WR(N). A first plate of the first capacitor C1 is electrically connected to the pull-up node Q. A second plate of the first capacitor C1 is electrically connected to the current-stage scanning signal output terminal WR (N).

The second output module 103 includes a third transistor T3. A gate of the third transistor T3 is electrically connected to the pull-up node Q. A first electrode of the third transistor T3 is electrically connected to the third clock signal input terminal CK3. A second electrode of the third transistor T3 is electrically connected to the current-stage transmission signal output terminal Cout (N).

The pull-down control module 104 includes a fourth transistor T4. A gate of the fourth transistor T4 is electrically connected to the first clock signal input terminal CK1. A first electrode of the fourth transistor T4 is electrically connected to a reference high-potential signal input terminal VGH. A second electrode of the fourth transistor T4 is electrically connected to the pull-down node P.

The first pull-down module 105 includes a fifth transistor T5. A gate of the fifth transistor T5 is electrically connected to the pull-up node Q. A first electrode of the fifth transistor T5 is electrically connected to the first clock signal input terminal CK1. A second electrode of the fifth transistor T5 is electrically connected to the pull-down node P.

The second pull-down module 106 includes a sixth transistor T6, a seventh transistor T7, and a second capacitor C2. A gate of the sixth transistor T6 is electrically connected to the pull-down node P, and a first electrode of the sixth transistor T6 is electrically connected to the reference low-potential signal input terminal VGL. A second electrode of the sixth transistor T6 is electrically connected to the current-stage scanning signal output terminal WR(N). A gate of the seventh transistor T7 is electrically connected to the pull-down node P. A first electrode of the seventh transistor T7 is electrically connected to the reference low-potential signal input terminal VGL. A second electrode of the seventh transistor T7 is electrically connected to the current-stage transmission signal output terminal Cout(N). A first plate of the second capacitor C2 is electrically connected to the pull-down node P. A second plate of the second capacitor C2 is electrically connected to the reference low-potentila signal input terminal VGL.

The pull-down maintenance module 107 includes an eighth transistor T8 and a ninth transistor T9. A gate of the eighth transistor T8 is electrically connected to the pull-down node P. A first electrode of the eighth transistor T8 is electrically connected to the reference low-potential signal input terminal VGL. A second electrode of the eighth transistor T8 is electrically connected to a first electrode of the ninth transistor T9. A gate of the ninth transistor T9 is electrically connected to the second clock signal input terminal CK2. A second electrode of the ninth transistor T9 is electrically connected to the pull-up node Q.

The gate driving circuit provided by the embodiment of the present application can control the potential of the pull-up node Q and the potential of the pull-down node P by controlling the potential of the first clock signal and the potential of the second clock signal. This greatly reduces the number of thin film transistors required by the gate driving unit and the number of driving signal input terminals that need to be connected, thus simplifying the structure of the gate driving circuit.

Figure 3:
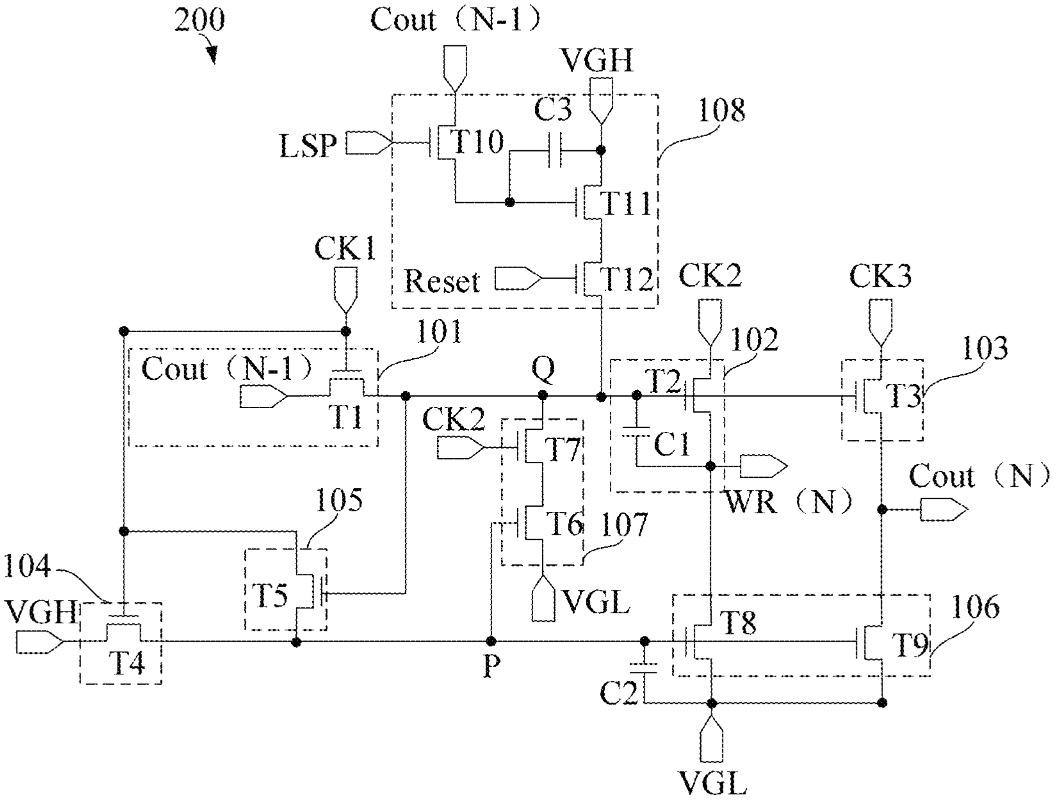
FIG. 3 is a schematic circuit diagram of a gate driving unit provided by a second embodiment of the present application.

As shown in FIG. 3, a second type of gate driving unit is provided by the embodiment of the present application, the difference between the gate driving unit 200 and the gate driving unit 100 is that the gate driving unit 200 also includes a detection module 108.

The detection module 108 is electrically connected to the pull-up node Q, the previous-stage transmission signal input terminal Cout (N−1), and a reset signal input terminal Reset. The detection module 108 is configured to raise the potential of the pull-up node Q in at least one stage of gate driving unit after all the multi-stage cascaded gate driving units output scanning signals of the same stage. Therefore, the current-stage scanning signal output terminal WR (N) outputs the current-stage scanning compensation signal wr1 under the control of the potential of the pull-up node Q.

The pull-up control module 101 is electrically connected to the first clock signal input terminal CK1, the previous-stage transmission signal input terminal Cout (N−1), and the pull-up node Q. The pull-up control module 101 is configured to pull up the potential of the pull-up node Q under the control of the first clock signal input from the first clock signal input terminal CK1.

The first output module 102 is electrically connected to the second clock signal input terminal CK2, the pull-up node Q, and the current-stage scanning signal output terminal WR(N). The first output module 102 is configured to output the current-stage scanning signal under the control of the potential of the pull-up node Q.

The second output module 103 is electrically connected to the third clock signal input terminal CK3, the pull-up node Q, and the current-stage transmission signal output terminal Cout (N). The second output module 103 is configured to output the current-stage transmission signal under the control of the potential of the pull-up node Q.

The pull-down control module 104 is electrically connected to the first clock signal input terminal CK1 and the pull-down node P. The pull-down control module 104 is configured to pull up the potential of the pull-down node P under the control of the first clock signal.

The first pull-down module 105 is electrically connected to the first clock signal input terminal CK1, the pull-up node Q, and the pull-down node P. The first pull-down module 105 is configured to pull the potential of the pull-down node P down to the potential of the first clock signal under the control of the potential of the pull-up node Q.

The second pull-down module 106 is electrically connected to the current-stage scanning signal output terminal WR (N), the current-stage transmission signal output terminal Cout (N), and the pull-down node P. The second pull-down module 106 is configured to pull down the potential of the current-stage scanning signal and the potential of the current-stage transmission signal under the control of the potential of the pull-down node P.

The pull-down maintenance module 107 is electrically connected to the second clock signal input terminal CK2, the pull-up node Q, and the pull-down node P. The pull-down maintenance module 107 is configured to maintain the potential of the pull-up node Q at a low potential under the control of the second clock signal input from the second clock signal input terminal CK2 and the potential of the pull-down node P.

The gate driving circuit provided by the embodiment of the present application can control the potential of the pull-up node Q and the potential of the pull-down node P by controlling the potential of the first clock signal and the potential of the second clock signal. This greatly reduces the number of thin film transistors required by the gate driving unit and the number of driving signal input terminals that need to be connected, thus simplifying the structure of the gate driving circuit. At the same time, by setting the detection module 108, external compensation can be performed on the pixel circuit of the pixel row corresponding to the gate driving unit, thereby improving the stability of the pixel circuit.

As shown in FIG. 3, the detection module 108 includes a tenth transistor T10, an eleventh transistor T11, a twelfth transistor T12, and a third capacitor C3. A gate of the tenth transistor T10 is electrically connected to the selection signal input terminal LSP. The first electrode of the tenth transistor T10 is electrically connected to the previous-stage transmission signal input terminal Cout (N−1). The second electrode of the tenth transistor T10 is electrically connected to the gate of the eleventh transistor T11. The first electrode of the eleventh transistor T11 is electrically connected to the reference high-potential signal input terminal VGH. The second electrode of the eleventh transistor T11 is electrically connected to the first electrode of the twelfth transistor T12. Therefore, the gate of the twelfth transistor T12 is electrically connected to the reset signal input terminal Reset. The second electrode of the twelfth transistor T12 is electrically connected to the pull-up node Q. The first plate of the third capacitor C3 is electrically connected to the gate of the eleventh transistor T11. The second plate of the third capacitor C3 is electrically connected to the first electrode of the eleventh transistor T11.

The pull-up control module 101 includes a first transistor T1. The gate of the first transistor T1 is electrically connected to the first clock signal input terminal CK1. The first electrode of the first transistor T1 is electrically connected to the previous-stage transmission signal input terminal Cout (N−1). The second electrode of the first transistor T1 is electrically connected to the pull-up node Q.

The first output module 102 includes a second transistor T2 and a first capacitor C1. The gate of the second transistor T2 is electrically connected to the pull-up node Q. The first electrode of the second transistor T2 is electrically connected to the second clock signal input terminal CK2. The second electrode of the second transistor T2 is electrically connected to the current-stage scanning signal output terminal WR(N). The first plate of the first capacitor C1 is electrically connected to the pull-up node Q. The second plate of the first capacitor C1 is electrically connected to the current-stage scanning signal output terminal WR (N).

The second output module 103 includes a third transistor T3. The gate of the third transistor T3 is electrically connected to the pull-up node Q. The first electrode of the third transistor T3 is electrically connected to the third clock signal input terminal CK3. The second electrode of the third transistor T3 is electrically connected to the current-stage transmission signal output terminal Cout (N).

The pull-down control module 104 includes a fourth transistor T4. The gate of the fourth transistor T4 is electrically connected to the first clock signal input terminal CK1. The first electrode of the fourth transistor T4 is electrically connected to the reference high-potential signal input terminal VGH. The second electrode of the fourth transistor T4 is electrically connected to the pull-down node P.

The first pull-down module 105 includes a fifth transistor T5. The gate of the fifth transistor T5 is electrically connected to the pull-up node Q. The first electrode of the fifth transistor T5 is electrically connected to the first clock signal input terminal CK1. The second electrode of the fifth transistor T5 is electrically connected to the pull-down node P.

The second pull-down module 106 includes a sixth transistor T6, a seventh transistor T7, and a second capacitor C2. The gate of the sixth transistor T6 is electrically connected to the pull-down node P. The first electrode of the sixth transistor T6 is electrically connected to the reference low-potential signal input terminal VGL. The second electrode of the sixth transistor T6 is electrically connected to the current-stage scanning signal output terminal WR(N). The gate of the seventh transistor T7 is electrically connected to the pull-down node P. The first electrode of the seventh transistor T7 is electrically connected to the reference low-potential signal input terminal VGL. The second electrode of the seventh transistor T7 is electrically connected to the current-stage transmission signal output terminal Cout (N). The first plate of the second capacitor C2 is electrically connected to the pull-down node P. The second plate of the second capacitor C2 is electrically connected to the reference low-potential signal input terminal VGL.

The pull-down maintenance module 107 includes an eighth transistor T8 and a ninth transistor T9. The gate of the eighth transistor T8 is electrically connected to the pull-down node P. The first electrode of the eighth transistor T8 is electrically connected to the reference low-potential signal input terminal VGL. The second electrode of the eighth transistor T8 is electrically connected to the first electrode of the ninth transistor T9. The gate of the ninth transistor T9 is electrically connected to the second clock signal input terminal CK2. The second electrode of the ninth transistor T9 is electrically connected to the pull-up node Q.

In the embodiment of the present application, the gate driving circuit includes a first clock signal input terminal CK1, a second clock signal input terminal CK2, a third clock signal input terminal CK3, a previous-stage transmission signal input terminal Cout (N−1), a reference high-potential signal input terminal VGH, a reference low-potential signal input terminal VGL, a selection signal input terminal LSP, and a reset signal input terminal Reset.

A first clock signal input terminal CK1 is configured to input the first clock signal ck1 to the gate driving unit. The second clock signal input terminal CK2 is configured to input the second clock signal ck2 to the gate driving unit. The third clock signal input terminal CK3 is configured to input the third clock signal ck3 to the gate driving unit. The current-stage transmission signal input terminal Cout (N−1) is configured to input the previous-stage transmission signal cout (N−1) to the gate driving unit. The reference high-potential signal input terminal VGH is configured to input the reference high-potential signal vgh to the gate driving unit. The reference low-potential signal input terminal VGL is configured to input the reference low-potential signal vgl to the gate driving unit. The selection signal input terminal LSP is configured to input the selection signal lsp to the gate driving unit. The reset signal input terminal Reset is configured to input the reset signal reset to the gate driving unit. The current-stage scanning signal output terminal WR (N) is configured to output the current-stage scanning signal wr and the current-stage scanning compensation signal wr1 to the scanning line. The current-stage transmission signal output terminal Cout (N) is configured to output the current-stage transmission signal cout (N) to the next stage gate driving unit.

Figure 4:
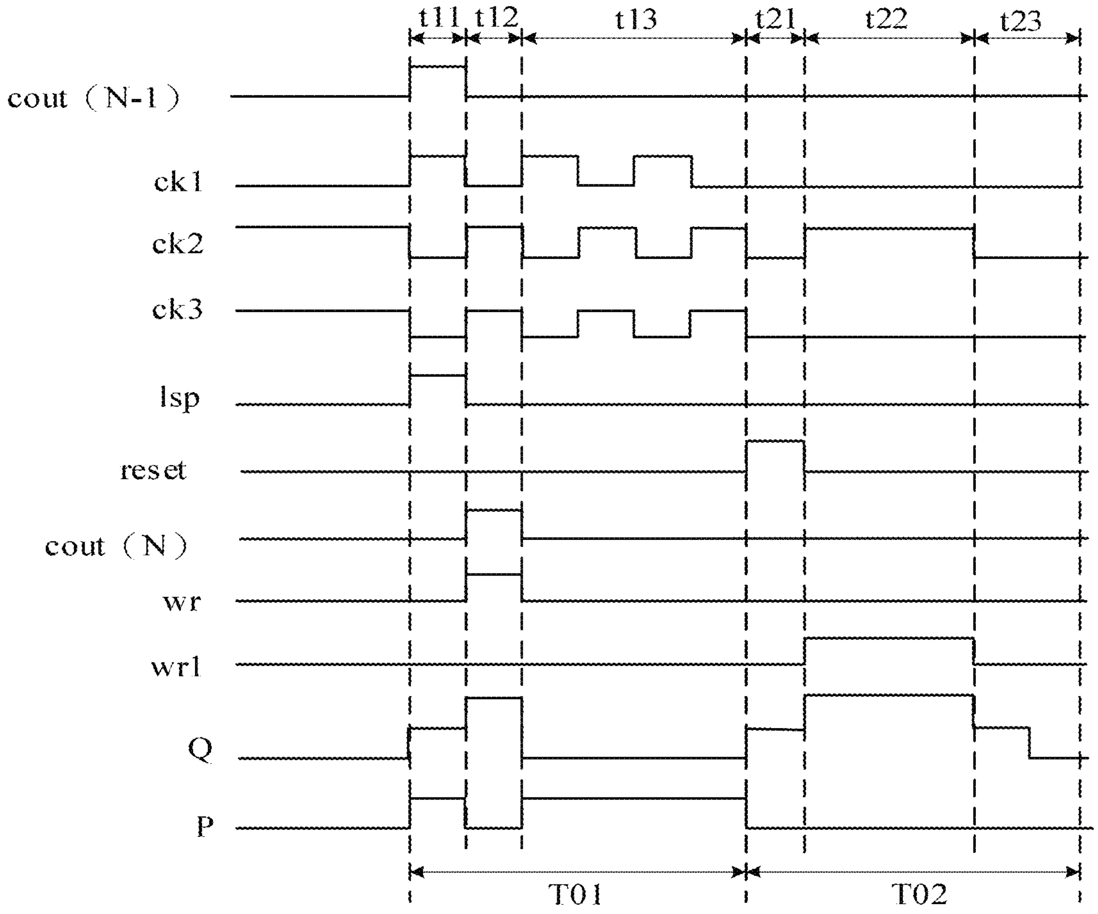
FIG. 4 is a signal timing diagram of a gate driving unit provided in FIG. 3.

As shown in FIGS. 3 and 4, the driving timing of the gate driving unit includes a display period T01 and a blank period T02. During the display period T01, the gate driving unit outputs a scanning signal to drive the display panel to display a picture. During the blank period T02, the detection module 108 pulls up the potential of the pull-up node Q in at least one potential of gate driving unit. Therefore, the current-stage scanning signal output terminal WR (N) outputs the current-stage scanning compensation signal wr1 under the control of the potential of the pull-up node Q. The threshold voltage of the driving transistor in the pixel unit in the display panel is compensated, that is, the pixel unit is externally compensated.

In the embodiment of the present application, the phase of the first clock signal ck1 and the phase of the second clock signal ck2 are opposite during the display period T01. The phase of the second clock signal ck2 is the same as the phase of the third clock signal ck3 input from the third clock signal input terminal CK3 during the display period T01.

Specifically, the display period T01 includes a first sub-display period t11, a second sub-display period t12, and a third sub-display period t13.

During the first sub-display period t11, the first clock signal ck1 is at a high potential. The previous-stage transmission signal cout (N−1) is high potential. The first transistor T1 and the fourth transistor T4 are turned on. The reference high potential signal vgh is transmitted to the pull-down node P through the fourth transistor T4. The potential of the pull-down node P is pulled high. The previous-stage transmission signal cout (N−1) is transmitted to the pull-up node Q through the first transistor T1. The potential of the pull-up node Q is pulled high. The second transistor T2, the third transistor T3, and the fifth transistor T5 are turned on under the control of the potential of the pull-up node Q. In addition, the selection signal lsp is at high potential. The potential of the previous stage transmission signal cout (N−1) is transmitted to the third capacitor C3 through the tenth transistor T10. The third capacitor C3 is configured to store the potential of the previous-stage transmission signal cout (N−1), and the eleventh transistor T11 is turned on.

During the second sub-display period t12, the first clock signal ck1 is transmitted to the pull-down node P through the fifth transistor T5, and the potential of the pull-down node P is pulled low. The second clock signal ck2 is high potential. The second clock signal ck2 is transmitted to the second plate of the first capacitor C1 through the second transistor T2. The potential of the second plate is coupled to the first plate of the first capacitor C1. As a result, the potential of the pull-up node Q is raised twice. The second clock signal ck2 is transmitted to the current-stage scanning signal output terminal WR (N) through the second transistor T2 to output the current-stage scanning signal. At the same time, the third clock signal ck3 is at a high potential. The third clock signal ck3 is transmitted to the current-stage transmission signal output terminal Cout (N) through the third transistor T3 to output the current-stage transmission signal. The upper potential transmits signal cout (N−1) and selects signal lsp to low potential.

In the third sub-display stage, when the first clock signal ck1 is at a high potential, the fourth transistor T4 is turned on. The reference high potential signal vgh is transmitted to the pull-down node P through the fourth transistor T4. The potential of the pull-down node P is maintained at a high potential. The potential of the reference high-level signal vgh is stored in the second capacitor C2. The second capacitor C2 is configured to maintain the potential of the pull-down node P. The high potential of the pull-down node P causes the sixth transistor T6 and the seventh transistor T7 to turn on. The reference low-potential signal vgl is transmitted to the current-stage scanning signal output terminal WR (N) through the sixth transistor T6. The potential of the current-stage scanning signal is pulled down. That is, the current-stage gate driving unit stops outputting the current-stage scanning signal. At the same time, the reference low potential signal vgl is transmitted to the current-stage transmission signal output terminal Cout (N) through the seventh transistor T7. The potential of the current-stage transmission signal is pulled down, that is, the current-stage gate driving unit stops outputting the current-stage transmission signal. Pulling down the high potential of the node P causes the eighth transistor T8 to turn on. When the second clock signal ck2 is at a high potential, the ninth transistor T9 is turned on. The reference low potential signal vgl is transmitted to the pull-up node Q through the eighth transistor T8 and the ninth transistor T9. The potential of pull-up node Q is pulled low. At this time, the upper stage transmission signal cout (N−1) remains at a low potential, so that the potential of the pull-up node Q remains at a low potential.

Specifically, the blank period T02 includes a first sub-blank period t21, a second sub-blank period t22, and a third sub-blank period t23.

In the embodiment of the present application, the potential of the first clock signal ck1, the potential of the second clock signal ck2, and the potential of the third clock signal ck3 are the same in the first sub-blank period t21. The potential of the first clock signal ck1 and the potential of the third clock signal ck3 are the same during the second sub-blank period t22. The potential of the second clock signal ck2 is opposite to the potential of the first clock signal ck1 during the second sub-blank period t22. The potentials of the first clock signal ck1, the second clock signal ck2, and the third clock signal ck3 are the same in the third sub-blank period t23.

In the first sub-blank period t21, the previous-stage transmission signal cout (N−1), the first clock signal ck1, the second clock signal ck2, the third clock signal ck3, and the selection signal lsp are all low potential. The potential of the pull-down node P is pulled down under the continuous input of the reference low potential signal vgl, and the sixth transistor T6, the seventh transistor T7, and the eighth transistor T8 are turned off.

The reset signal reset is at a high potential, and the twelfth transistor T12 is turned on. The eleventh transistor T11 remains open under the control of the potential of the third capacitor C3. The reference high potential signal vgh is transmitted to the pull-up node Q through the eleventh transistor T11 and the twelfth transistor T12. The potential of the pull-up node Q is pulled high, and the second transistor T2 is turned on.

During the second sub-blank period t22, the reset signal reset is low, that is, charging of the pull-up node Q is stopped. The second clock signal ck2 is high potential. The second clock signal ck2 is transmitted to the current-stage scanning signal output terminal WR (N) through the second transistor T2. The current-stage gate driving unit outputs the current-stage scanning compensation signal wr1. The second clock signal ck2 is transmitted to the second plate of the first capacitor C1 through the second transistor T2. The potential of the second plate is coupled to the first plate of the first capacitor C1, so that the potential of the pull-up node Q is raised twice.

In the third sub-blank period t23, the previous-stage transmission signal cout (N−1), the first clock signal ck1, the second clock signal ck2, the third clock signal ck3, the selection signal lsp and the reset signal reset are all low potential. The potential of the pull-up node Q decreases, and the output of the scanning compensation signal wr1 of this stage is cut off.

The above describes in detail a gate driving circuit and a display panel provided by embodiments of the present application. The description of the above embodiments is only used to help understand the core idea of the present application, and the above description should not be understood as limiting the protection scope of the present application.

What is claimed is:

1. A gate driving circuit, comprising:

a gate driving unit arranged in a multi-stage cascade, wherein the gate driving unit comprises a pull-up control module, a pull-up node, a first output module, a second output module, a pull-down control module, a first pull-down module, a pull-down node, a second pull-down module, and a pull-down maintenance module;

wherein the pull-up control module is electrically connected to a first clock signal input terminal and the pull-up node, and the pull-up control module is configured to pull up a potential of the pull-up node under a control of a first clock signal input at the first clock signal input terminal;

wherein the first output module is electrically connected to a second clock signal input terminal, the pull-up node, and a current-stage scanning signal output terminal, the first output module is configured to output a current-stage scanning signal under a control of the potential of the pull-up node;

wherein the second output module is electrically connected to a third clock signal input terminal, the pull-up node, and a current-stage transmission signal output terminal, and the second output module is configured to output a current-stage transmission signal under the control of the potential of the pull-up node;

wherein the pull-down control module is electrically connected to the first clock signal input terminal and the pull-down node, and the pull-down control module is configured to pull up a potential of the pull-down node under a control of the first clock signal;

wherein the first pull-down module is electrically connected to the first clock signal input terminal, the pull-up node, and the pull-down node, and the first pull-down module is configured to pull the potential of the pull-down node down to a potential of the first clock signal under the control of the potential of the pull-up node;

wherein the second pull-down module is electrically connected to the current-stage scanning signal output terminal, the current-stage transmission signal output terminal, and the pull-down node, and the second pull-down module is configured to pull down a potential of the current-stage scanning signal and the potential of the current-stage transmission signal under the control of the potential of the pull-down node;

wherein the pull-down maintenance module is electrically connected to the second clock signal input terminal, the pull-up node, and the pull-down node, and the pull-down maintenance module is configured to maintain the potential of the pull-up node at a low potential under a control of a second clock signal input from the second clock signal input terminal and the potential of the pull-down node.

2. The gate driving circuit according to claim 1, wherein a phase of the first clock signal is opposite to a phase of the second clock signal, and the phase of the second clock signal is the same as a phase of a third clock signal input from a third clock signal input terminal.

3. The gate driving circuit according to claim 1, wherein the pull-up control module comprises a first transistor, a gate of the first transistor is electrically connected to a first clock signal input terminal, a first electrode of the first transistor is electrically connected to a previous-stage transmission signal input terminal, and a second electrode of the first transistor is electrically connected to the pull-up node.

4. The gate driving circuit according to claim 1, wherein the first output module comprises a second transistor and a first capacitor, a gate of the second transistor is electrically connected to the pull-up node, a first electrode of the second transistor is electrically connected to the second clock signal input terminal, and a second electrode of the second transistor is electrically connected to the current-stage scanning signal output terminal;

wherein a first plate of the first capacitor is electrically connected to the pull-up node, and a second plate of the first capacitor is electrically connected to the current-stage scanning signal output terminal;

wherein the second output module comprises a third transistor, a gate of the third transistor is electrically connected to the pull-up node, a first electrode of the third transistor is electrically connected to the third clock signal input terminal, and a second electrode of the third transistor is electrically connected to the current-stage signal output terminal.

5. The gate driving circuit according to claim 1, wherein the pull-down control module comprises a fourth transistor, a gate of the fourth transistor is electrically connected to the first clock signal input terminal, a first electrode of the fourth transistor is electrically connected to a reference high-potential signal input terminal, and a second electrode of the fourth transistor is electrically connected to the pull-down node.

6. The gate driving circuit according to claim 1, wherein the first pull-down module comprises a fifth transistor, a gate of the fifth transistor is electrically connected to the pull-up node, a first electrode of the fifth transistor is electrically connected to the first clock signal input terminal, and a second electrode of the fifth transistor is electrically connected to the pull-down node;

wherein the second pull-down module comprises a sixth transistor, a seventh transistor, and a second capacitor, a gate of the sixth transistor is electrically connected to the pull-down node, a first electrode of the sixth transistor is electrically connected to a reference low-potential signal input terminal, and a second electrode of the sixth transistor is electrically connected to the current-stage scanning signal output terminal;

wherein a gate of the seventh transistor is electrically connected to the pull-down node, a first electrode of the seventh transistor is electrically connected to the reference low-potential signal input terminal, and a second electrode of the seventh transistor is electrically connected to the current-stage signal output terminal;

wherein a first plate of the second capacitor is electrically connected to the pull-down node, and a second plate of the second capacitor is electrically connected to the reference low-potential signal input terminal.

7. The gate driving circuit according to claim 1, wherein the pull-down maintenance module comprises an eighth transistor and a ninth transistor, a gate of the eighth transistor is electrically connected to the pull-down node, a first electrode of the eighth transistor is electrically connected to the reference low-potential signal input terminal, and a second electrode of the eighth transistor is electrically connected to a first electrode of the ninth transistor;

wherein a gate of the ninth transistor is electrically connected to a second clock signal input terminal, and a second electrode of the ninth transistor is electrically connected to the pull-up node.

8. The gate driving circuit according to claim 1, wherein the gate driving unit further comprises a detection module, the detection module is electrically connected to the pull-up node, and the detection module is configured to raise the potential of the pull-up node in at least one stage of the gate driving unit after all the gate driving units in the multi-stage cascade output the current-stage scanning signal;

wherein the current-stage scanning signal output terminal outputs a current-stage scanning compensation signal under the control of the potential of the pull-up node.

9. The gate driving circuit according to claim 8, wherein the detection module comprises a tenth transistor, an eleventh transistor, a twelfth transistor, and a third capacitor, a gate of the tenth transistor is electrically connected to a selection signal input terminal, a first electrode of the tenth transistor is electrically connected to the previous-stage signal input terminal, and a second electrode of the tenth transistor is electrically connected to a gate of the eleventh transistor;

wherein the first electrode of the eleventh transistor is electrically connected to the reference high-potential signal input terminal, and a second electrode of the eleventh transistor is electrically connected to a first electrode of the twelfth transistor;

wherein a gate of the twelfth transistor is electrically connected to a reset signal input terminal, and a second electrode of the twelfth transistor is electrically connected to the pull-up node;

wherein a first plate of the third capacitor is electrically connected to a gate of the eleventh transistor, and a second plate of the third capacitor is electrically connected to the first electrode of the eleventh transistor.

10. A display panel, comprising:

a pixel unit and a gate driving circuit, wherein the gate driving circuit is electrically connected to the pixel unit;

wherein the gate driving circuit comprises a gate driving unit arranged in a multi-stage cascade, wherein the gate driving unit comprises a pull-up control module, a pull-up node, a first output module, a second output module, a pull-down control module, a first pull-down module, a pull-down node, a second pull-down module, and a pull-down maintenance module;

wherein the pull-up control module is electrically connected to a first clock signal input terminal and the pull-up node, and the pull-up control module is configured to pull up a potential of the pull-up node under a control of a first clock signal input at the first clock signal input terminal;

wherein the first output module is electrically connected to a second clock signal input terminal, the pull-up node, and a current-stage scanning signal output terminal, the first output module is configured to output a current-stage scanning signal under a control of the potential of the pull-up node;

wherein the second output module is electrically connected to a third clock signal input terminal, the pull-up node, and a current-stage transmission signal output terminal, and the second output module is configured to output a current-stage transmission signal under the control of the potential of the pull-up node;

wherein the pull-down control module is electrically connected to the first clock signal input terminal and the pull-down node, and the pull-down control module is configured to pull up a potential of the pull-down node under a control of the first clock signal;

wherein the first pull-down module is electrically connected to the first clock signal input terminal, the pull-up node, and the pull-down node, and the first pull-down module is configured to pull the potential of the pull-down node down to a potential of the first clock signal under the control of the potential of the pull-up node;

wherein the second pull-down module is electrically connected to the current-stage scanning signal output terminal, the current-stage transmission signal output terminal, and the pull-down node, and the second pull-down module is configured to pull down a potential of the current-stage scanning signal and the potential of the current-stage transmission signal under the control of the potential of the pull-down node;

wherein the pull-down maintenance module is electrically connected to the second clock signal input terminal, the pull-up node, and the pull-down node, and the pull-down maintenance module is configured to maintain the potential of the pull-up node at a low potential under a control of a second clock signal input from the second clock signal input terminal and the potential of the pull-down node.

11. The display panel according to claim 10, wherein a phase of the first clock signal is opposite to a phase of the second clock signal.

12. The display panel according to claim 10, wherein a phase of the second clock signal is the same as a phase of a third clock signal input from a third clock signal input terminal.

13. The display panel according to claim 10, wherein the pull-up control module comprises a first transistor, a gate of the first transistor is electrically connected to a first clock signal input terminal, a first electrode of the first transistor is electrically connected to a previous-stage transmission signal input terminal, and a second electrode of the first transistor is electrically connected to the pull-up node.

14. The display panel according to claim 10, wherein the first output module comprises a second transistor and a first capacitor, a gate of the second transistor is electrically connected to the pull-up node, a first electrode of the second transistor is electrically connected to the second clock signal input terminal, and a second electrode of the second transistor is electrically connected to the current-stage scanning signal output terminal;

wherein a first plate of the first capacitor is electrically connected to the pull-up node, and a second plate of the first capacitor is electrically connected to the current-stage scanning signal output terminal.

15. The display panel according to claim 10, wherein the second output module comprises a third transistor, a gate of the third transistor is electrically connected to the pull-up node, a first electrode of the third transistor is electrically connected to the third clock signal input terminal, and a second electrode of the third transistor is electrically connected to the current-stage signal output terminal.

16. The display panel according to claim 10, wherein the pull-down control module comprises a fourth transistor, a gate of the fourth transistor is electrically connected to the first clock signal input terminal, a first electrode of the fourth transistor is electrically connected to a reference high-potential signal input terminal, and a second electrode of the fourth transistor is electrically connected to the pull-down node.

17. The display panel according to claim 10, wherein the first pull-down module comprises a fifth transistor, a gate of the fifth transistor is electrically connected to the pull-up node, a first electrode of the fifth transistor is electrically connected to the first clock signal input terminal, and a second electrode of the fifth transistor is electrically connected to the pull-down node;

wherein the second pull-down module comprises a sixth transistor, a seventh transistor, and a second capacitor, a gate of the sixth transistor is electrically connected to the pull-down node, a first electrode of the sixth transistor is electrically connected to a reference low-potential signal input terminal, and a second electrode of the sixth transistor is electrically connected to the current-stage scanning signal output terminal;

wherein a gate of the seventh transistor is electrically connected to the pull-down node, a first electrode of the seventh transistor is electrically connected to the reference low-potential signal input terminal, and a second electrode of the seventh transistor is electrically connected to the current-stage signal output terminal;

wherein a first plate of the second capacitor is electrically connected to the pull-down node, and a second plate of the second capacitor is electrically connected to the reference low-potential signal input terminal.

18. The display panel according to claim 10, wherein the pull-down maintenance module comprises an eighth transistor and a ninth transistor, a gate of the eighth transistor is electrically connected to the pull-down node, a first electrode of the eighth transistor is electrically connected to the reference low-potential signal input terminal, and a second electrode of the eighth transistor is electrically connected to a first electrode of the ninth transistor;

wherein a gate of the ninth transistor is electrically connected to a second clock signal input terminal, and a second electrode of the ninth transistor is electrically connected to the pull-up node.

19. The display panel according to claim 10, wherein the gate driving unit further comprises a detection module, the detection module is electrically connected to the pull-up node, and the detection module is configured to raise the potential of the pull-up node in at least one stage of the gate driving unit after all the gate driving units in the multi-stage cascade output the current-stage scanning signal;

wherein the current-stage scanning signal output terminal outputs a current-stage scanning compensation signal under the control of the potential of the pull-up node.

20. The display panel according to claim 19, wherein the detection module comprises a tenth transistor, an eleventh transistor, a twelfth transistor, and a third capacitor, a gate of the tenth transistor is electrically connected to a selection signal input terminal, a first electrode of the tenth transistor is electrically connected to the previous-stage signal input terminal, and a second electrode of the tenth transistor is electrically connected to a gate of the eleventh transistor;

wherein the first electrode of the eleventh transistor is electrically connected to the reference high-potential signal input terminal, and a second electrode of the eleventh transistor is electrically connected to a first electrode of the twelfth transistor;

wherein a gate of the twelfth transistor is electrically connected to a reset signal input terminal, and a second electrode of the twelfth transistor is electrically connected to the pull-up node;

wherein a first plate of the third capacitor is electrically connected to a gate of the eleventh transistor, and a second plate of the third capacitor is electrically connected to the first electrode of the eleventh transistor.

* * * * *